US012602916B2

(12) United States Patent
Zavesky et al.

(10) Patent No.: US 12,602,916 B2
(45) Date of Patent: *Apr. 14, 2026

(54) OBJECT MODELING WITH ADVERSARIAL LEARNING

(71) Applicant: AT&T Intellectual Property I, L.P., Atlanta, GA (US)

(72) Inventors: Eric Zavesky, Austin, TX (US); Raghuraman Gopalan, Dublin, CA (US); Behzad Shahraray, Holmdel, NJ (US); David Crawford Gibbon, Lincroft, NJ (US); Bernard S. Renger, New Providence, NJ (US); Paul Triantafyllou, Watchung, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1065 days.

This patent is subject to a terminal disclaimer.

(21) Appl. No.: 17/493,770

(22) Filed: Oct. 4, 2021

(65) Prior Publication Data

US 2022/0026905 A1 Jan. 27, 2022

Related U.S. Application Data

(63) Continuation of application No. 15/818,495, filed on Nov. 20, 2017, now Pat. No. 11,137,761.

(51) Int. Cl.
*G06N 20/00* (2019.01)
*B60W 30/095* (2012.01)
(Continued)

(52) U.S. Cl.
CPC ......... *G06V 10/82* (2022.01); *B60W 30/0953* (2013.01); *G05D 1/0088* (2013.01);
(Continued)

(58) Field of Classification Search
None
See application file for complete search history.

(56) References Cited

U.S. PATENT DOCUMENTS 9,720,415 B2    8/2017    Levinson et al.
9,730,643 B2    8/2017    Georgescu et al.
(Continued)

FOREIGN PATENT DOCUMENTS

CN      106845471 A    6/2017

OTHER PUBLICATIONS

Hirose et al., "To Go or Not To Go? A Near Unsupervised Learning Approach For Robot Navigation," arXiv preprint arXiv: 1709. 05439 (Sep. 2017). 8 pages.

*Primary Examiner* — David R Vincent

(57) ABSTRACT

Methods, computer-readable media, and devices are disclosed for improving an object model based upon measurements of physical properties of an object via an unmanned vehicle using adversarial examples. For example, a method may include a processing system capturing measurements of physical properties of an object via at least one unmanned vehicle, updating an object model for the object to include the measurements of the physical properties of the object, where the object model is associated with a feature space, and generating an example from the feature space, where the example comprises an adversarial example. The processing system may further apply the object model to the example to generate a prediction, capture additional measurements of the physical properties of the object via the at least one unmanned vehicle when the prediction fails to identify that the example is an adversarial example, and update the object model to include the additional measurements.

20 Claims, 3 Drawing Sheets

(51) Int. Cl.

| | |
|---|---|
| *G05D 1/00* | (2006.01) |
| *G06F 18/2413* | (2023.01) |
| *G06N 5/022* | (2023.01) |
| *G06V 10/764* | (2022.01) |
| *G06V 10/82* | (2022.01) |
| *G06V 20/56* | (2022.01) |
| *G06V 20/64* | (2022.01) |
| *B60W 30/09* | (2012.01) |
| *B64U 101/30* | (2023.01) |
| *G06V 20/13* | (2022.01) |

(52) U.S. Cl.
CPC ....... *G05D 1/0094* (2013.01); *G06F 18/2413* (2023.01); *G06N 5/022* (2013.01); *G06V 10/764* (2022.01); *G06V 20/56* (2022.01); *G06V 20/64* (2022.01); *B60W 30/09* (2013.01); *B64U 2101/30* (2023.01); *B64U 2201/10* (2023.01); *G05D 1/0246* (2013.01); *G06V 20/13* (2022.01)

(56) References Cited

U.S. PATENT DOCUMENTS

| | | | |
|---|---|---|---|
| 2009/0087029 A1* | 4/2009 | Coleman .............. | G06V 10/255 |
| | | | 382/103 |
| 2017/0031934 A1 | 2/2017 | Snoek | |
| 2017/0200265 A1 | 7/2017 | Bhaskar | |
| 2017/0206440 A1 | 7/2017 | Schrier et al. | |
| 2019/0042859 A1* | 2/2019 | Schubert .................. | G05D 1/00 |
| 2019/0149425 A1 | 5/2019 | Larish et al. | |
| 2019/0325621 A1* | 10/2019 | Wang ..................... | G06N 3/045 |

* cited by examiner

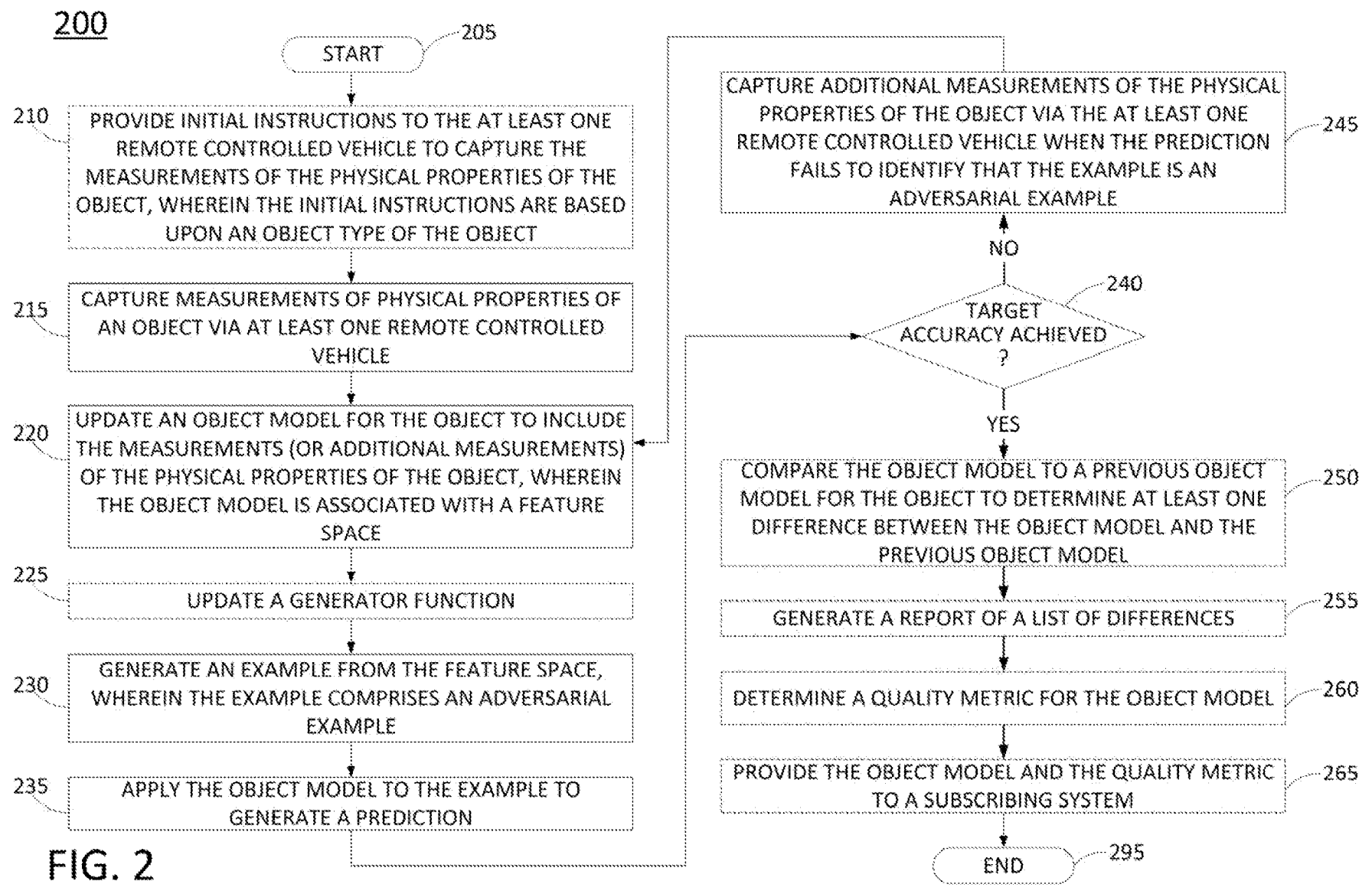

200

START — 205

210 — PROVIDE INITIAL INSTRUCTIONS TO THE AT LEAST ONE REMOTE CONTROLLED VEHICLE TO CAPTURE THE MEASUREMENTS OF THE PHYSICAL PROPERTIES OF THE OBJECT, WHEREIN THE INITIAL INSTRUCTIONS ARE BASED UPON AN OBJECT TYPE OF THE OBJECT

215 — CAPTURE MEASUREMENTS OF PHYSICAL PROPERTIES OF AN OBJECT VIA AT LEAST ONE REMOTE CONTROLLED VEHICLE

220 — UPDATE AN OBJECT MODEL FOR THE OBJECT TO INCLUDE THE MEASUREMENTS (OR ADDITIONAL MEASUREMENTS) OF THE PHYSICAL PROPERTIES OF THE OBJECT, WHEREIN THE OBJECT MODEL IS ASSOCIATED WITH A FEATURE SPACE

225 — UPDATE A GENERATOR FUNCTION

230 — GENERATE AN EXAMPLE FROM THE FEATURE SPACE, WHEREIN THE EXAMPLE COMPRISES AN ADVERSARIAL EXAMPLE

235 — APPLY THE OBJECT MODEL TO THE EXAMPLE TO GENERATE A PREDICTION

245 — CAPTURE ADDITIONAL MEASUREMENTS OF THE PHYSICAL PROPERTIES OF THE OBJECT VIA THE AT LEAST ONE REMOTE CONTROLLED VEHICLE WHEN THE PREDICTION FAILS TO IDENTIFY THAT THE EXAMPLE IS AN ADVERSARIAL EXAMPLE

240 — TARGET ACCURACY ACHIEVED ?   NO / YES

250 — COMPARE THE OBJECT MODEL TO A PREVIOUS OBJECT MODEL FOR THE OBJECT TO DETERMINE AT LEAST ONE DIFFERENCE BETWEEN THE OBJECT MODEL AND THE PREVIOUS OBJECT MODEL

255 — GENERATE A REPORT OF A LIST OF DIFFERENCES

260 — DETERMINE A QUALITY METRIC FOR THE OBJECT MODEL

265 — PROVIDE THE OBJECT MODEL AND THE QUALITY METRIC TO A SUBSCRIBING SYSTEM

END — 295

FIG. 2

OBJECT MODELING WITH ADVERSARIAL LEARNING

This application is a continuation of U.S. patent application Ser. No. 15/818,495, filed on Nov. 20, 2017, now U.S. Pat. No. 11,137,761, which is herein incorporated by reference in its entirety.

The present disclosure relates generally to autonomous vehicle operations, and more particularly to devices, computer-readable media, and methods for improving an object model based upon measurements of physical properties of an object using adversarial examples.

BRIEF DESCRIPTION OF THE DRAWINGS

The teaching of the present disclosure can be readily understood by considering the following detailed description in conjunction with the accompanying drawings, in which:

FIG. 2 illustrates a flowchart of an example method for improving an object model based upon measurements of physical properties of an object using adversarial examples, in accordance with the present disclosure.

To facilitate understanding, identical reference numerals have been used, where possible, to designate identical elements that are common to the figures.

DETAILED DESCRIPTION

Figure 1:
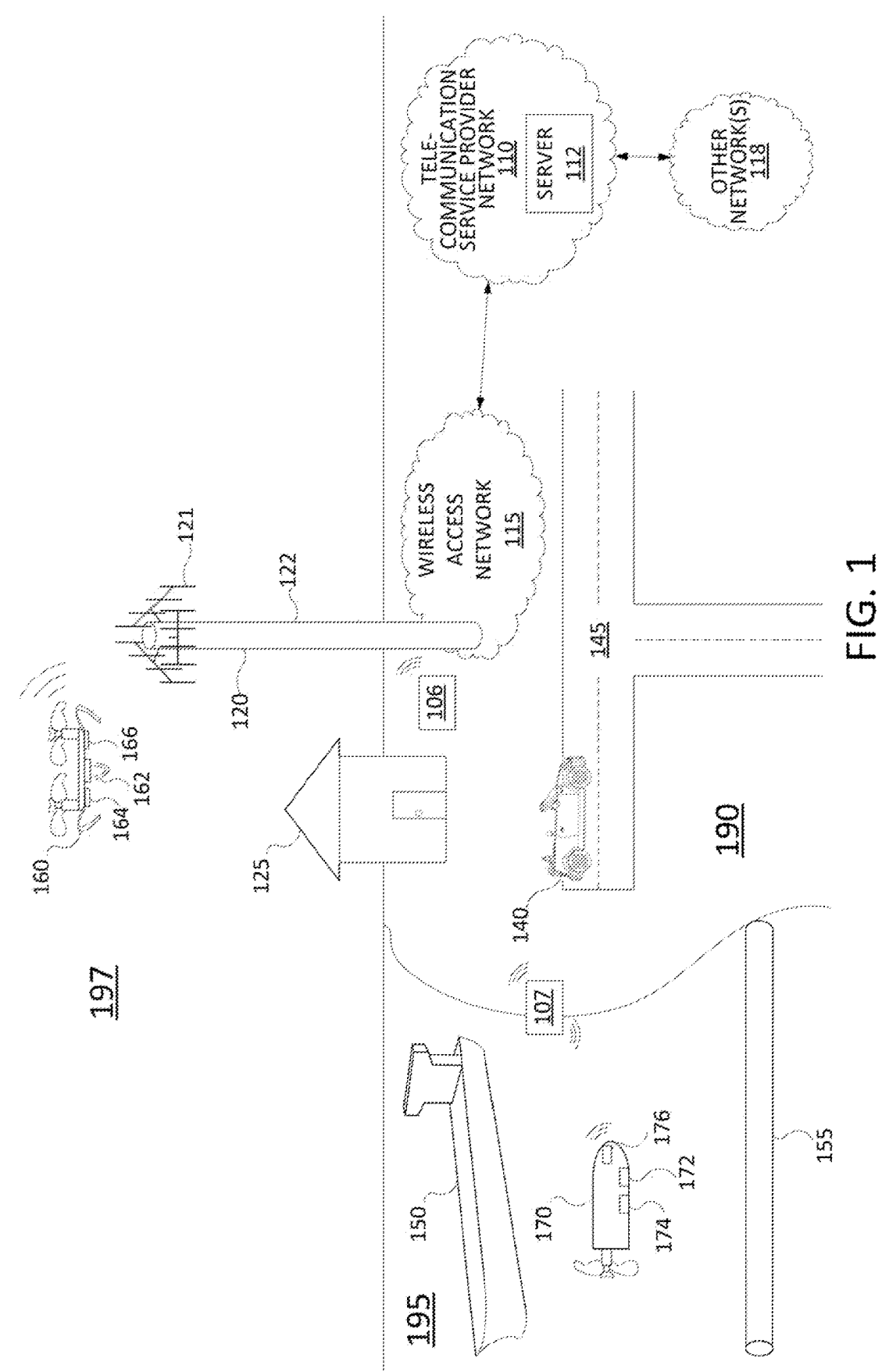
FIG. 1 illustrates an example system related to the present disclosure.

An increasing number of vision and image based systems are employed for automated tasks. However, many object recognition algorithms (including facial recognition algorithms) perform optimally under uniform lighting and static conditions.

In one example, the present disclosure discloses a method, computer-readable medium, and device for improving an object model based upon measurements of physical properties of an object using adversarial examples. For example, a method may include a processing system including at least one processor capturing measurements of physical properties of an object via at least one unmanned vehicle, updating an object model for the object to include the measurements of the physical properties of the object, where the object model is associated with a feature space, and generating an example from the feature space, where the example comprises an adversarial example. The processing system may further apply the object model to the example to generate a prediction, capture additional measurements of the physical properties of the object via the at least one unmanned vehicle when the prediction fails to identify that the example is an adversarial example, and update the object model to include the additional measurements of the physical properties of the object.

The present disclosure broadly discloses methods, computer-readable media, and devices for improving an object model based upon measurements of physical properties of an object using adversarial examples. In particular, examples of the present disclosure relate to a system that employs adversarial appearance learning to generate an accurate model of an object, where the adversarial appearance learning is in accordance with a generative adversarial network (GAN) training process. Generative adversarial networks (GAN) are used for tasks such as creating new data to explore possible future scenarios in a simulated environment, creating realistic images from sketches, converting aerial photographs into maps, creating convolutions of different images or objects, performing next frame video detection, and so on. For example, a GAN may start with an image, down-sample the image, and try to recreate the image. The result may not be an exact replica, but something similar and that is visually pleasing.

In one example, a GAN include two main subroutines, a generator and a discriminator. In one example, the discriminator is a differentiable function "D" with parameters that can be learned, e.g., from gradient descent, coordinate descent, kernel trick, etc. In general, the discriminator is a machine learning model that determines whether new data is or is not part of a class represented by training data. Thus, the discriminator is trained on the training data via a machine learning algorithm (MLA). In one example, the discriminator is a neural network, e.g., a deep neural network (DNN). In other examples, the discriminator may comprise a different type of machine learning model, such as support vector machine (SVM)-based classifier, e.g., a binary classifier and/or a linear binary classifier, a multiclass classifier, a kernel-based SVM, etc., a distance-based classifier, e.g., a Euclidean distance-based classifier, or the like, or a non-classifier type machine learning model, such as a decision tree, a k-nearest neighbor (KNN) predictive model, and so forth. In general, GANs can utilize supervised, unsupervised, or semi-supervised learning (partially labeled data). In one example, the discriminator uses actual measured data as training data, and may fill in the gaps in the measured data using any number of techniques, such as linear interpolation, local kernel fitting, structure tensor-based interpolation, etc.

The generator tries to generate new samples, referred to as adversarial examples, intended to represent the samples that are in the training data, but which are not drawn directly from the training data. Samples from the generator (adversarial examples) and samples from the training data are both applied to the discriminator. The discriminator determines whether the sample is real (i.e., from the training data) or fake (i.e., from the generator). Thus, the discriminator is trained on both actual training data and adversarial examples from the generator. In general, the generator is also a differentiable function "G" that can be learned, e.g., from gradient descent, coordinate descent, kernel trick, etc. The generator may also be of a same or a different type as the discriminator, e.g., a DNN, a SVM-based classifier, a decision tree, a KNN predictive model, etc. In one example, the generator "G" is paired with a source of noise factor "z" that is used to randomly or semi-randomly generate adversarial examples from a feature space associated with the training data. In one example, applying "z" to "G" may result in samples uniform-randomly selected from the feature space. However, over multiple iterations, the optimization criteria for "G" will cause the generator to more selectively generate (adversarial) examples that are close to "D" so that the classification error of "D" is increased. In one example, the source of noise factor "z" may be constrained to cause adversarial examples of the generator "G" to be within a given deviation.

In one example, a GAN may retrain the discriminator if the accuracy of the discriminator "D" falls below a threshold (or if the classification error exceeds a threshold). Through updating with new training data, the discriminator is optimized to correctly identify fake data/adversarial examples (e.g., to output a zero), while the generator is optimized to have the discriminator fail to correctly identify fake data/ adversarial examples (e.g., to output a one, whereas a zero is the correct output). Qualitatively, the generator attempts to provide adversarial examples that are indistinguishable from the real data, i.e., the training data. Each round of training the discriminator includes generated examples (adversarial examples from the generator) and real examples from the training data. The generator may also be updated through various training rounds, e.g., through backpropagation. However, the discriminator may be updated less frequently than the generator. For instance, the generator may be updated every round, every several rounds, etc., while the discriminator may operate without updating until its accuracy falls below a given percentage e.g., below 90 percent).

In accordance with the present disclosure, the accuracy of the discriminator with respect to the adversarial examples from the generator is used as feedback to a data capture system (e.g., one or more unmanned camera-equipped vehicles) to obtain additional measurements. The discriminator may then be retrained with the additional measurements, thereby increasing the accuracy of the discriminator. For instance, in one example, the present disclosure comprises a data capture system that interacts with a control system with adversarial logic, e.g., a generative adversarial network (GAN). In one example, the data capture system captures measurements of physical properties of the object, the "training data" that is used to train the discriminator. In one example, the control system may construct the discriminator as an object model representing the training data (and hence the object), such as a deep neural network (DNN). In one example, the object model, or object function, may comprise a hyperplane in a multidimensional feature space with dimensions associated with various physical properties, e.g., where the discriminator is a SVM-based classifier. In one example, techniques such as principal component analysis (PCA) and dimensionality reduction may be employed to reduce the computational load of the GAN training. The object model may be refined on an ongoing basis as the data capture system captures additional measurements of physical properties of the object. In one example, the training process may end when there is equilibrium in the optimization of the discriminator and the generator; in other words, where neither can be improved any further. In one example, the training process may stop when the respective optimization criteria of the discriminator and the generator are within a threshold difference. When there is sparse training data, aspects of the object model may be estimated in a variety of ways. For example, region filling techniques, feature matching or feature fusion process, depth estimation algorithms, and the like may be individually or collectively employed. As iterations of the GAN process continue and actual measurements pertaining to these estimates are captured, the discriminator may evolve to reflect the actual measured data rather than the estimates of such features.

In one example, the control system may include a set of initial instructions from the data capture system to begin capturing measurements of physical properties of the object. For instance, the control system may include an initial flight plan for a UAV or a squad of UAVs to capture measurements of physical properties of a cell tower which may be provided to the UAV(s) at the beginning of a GAN training process. A different initial flight plan may exist with respect to other types of objects, such as a roadway, a building, a ship, and so forth. However, in another example, the data capture system may begin with blind collection. For instance, a UAV may capture measurements of physical properties of an object without any preconceived notion of the shape or dimensions of the object. Nevertheless, the UAV may include native or primitive controls such that the UAV does not crash, even without prior knowledge of what object, if any, is at a given location, or the shape of such an object.

In parallel with the capture of measurements of physical properties of the object via the data capture system, the control system may generate adversarial examples via a GAN generator subroutine. In addition, examples from the object model/training data may also be generated. The adversarial examples and examples from the training data may then be applied to a discriminator to determine whether the examples are adversarial examples, or examples from the training data. When the discriminator fails to properly categorize an adversarial example, the controller may direct the unmanned vehicle to capture additional measurements of physical properties of the object. For example, the control system may direct the capture system to capture additional measurements of physical properties of the object (additional training data), with specific focus upon areas or aspects of the object where the adversarial example(s) deviates from the object model. The additional measurements may be added to the training data and the object model may be refined/updated to account for the additional measurements. For instance, the object model may approximate aspects of the object for which there are no actual measurements, or the details of the measurements are not specific enough. However, with additional measurements, previously estimated or inferred aspects of the object may be accounted for in the object model that reflects the actual measurements.

Examples of the present disclosure provide active capture control, where the data capture system (e.g., one or more unmanned vehicles) can be manipulated through programmatic means (e.g., a controller, software settings, an application programming interface (API), etc.). In one example, active capture control may comprise changing the position of one or more capture devices. For example, if a camera used for capture is mounted on an unmanned aerial vehicle (UAV) or an aerial drone, the active capture control may include sending instructions to the UAV to reposition, to move a camera on an arm, to adjust the pan, tilt, zoom settings (PTZ)), and so forth. However, active capture control is not limited to mechanical adjustments, but more generally includes modifying the captured measurements in qualitative ways (e.g., position, lighting, exposure, closeness to object, etc.). For example, active capture control may include manipulating the illumination of the object with a given light profile and/or using one or more different measurement types, e.g., visual red-green-blue, depth image, or infra-red). Active capture control may also include modulations of time of capture (e.g., night or day) or weather conditions for capture. In any event, the capture devices are configured to receive instructions and effect such active changes and the control system is configured to issue such change requests.

The control system may be programmed with one or more specific objectives or target criteria that modulate how the control system changes capture conditions like robustness to viewing angle, lighting changes, elimination of three-dimensional "holes" in a model, and model precision (e.g., distance precision, such as centimeter resolution versus millimeter resolution, nanometer resolution, etc., precision regarding color quantization, and so forth). The control system engages in a feedback loop that integrates additional captured measurements of physical properties of the object into the object model, determines a possible weakness according to the target criteria, and changes the capture settings to gather additional measurements. Thus, the control system can tune adversarial precision controls that reduce measured error with respect to target criteria. In one example, the control system achieves these targets by constraining the source of noise factor "z" to cause adversarial examples of the generator to be within a given deviation. In one example, "z" my be progressively constrained such that at each round of updating "G" and/or "D," the bounds of "z" may be further restricted. For instance, in an early round "z" may be permitted to cause adversarial examples to stray up to 4 cm from any measured value reflected in "D" or from one or more parameters of "G." However, in a subsequent round, "z" may be constrained to a 5 mm variance.

In addition, when the discriminator, or object model, is generated in accordance with the target criteria, the control system may provide the object model to other systems with a quality metric associated with the target criteria. For example, a computer simulation environment may be used to simulate stress tests of a particular object, e.g., regarding wind loading, bending resilience, etc. In another example, a three-dimensional printer may be used to fabricate a full size or scale model of the object for use in tests/simulations. Previously, the simulations may have assumed a certain amount of inaccuracy in the object model under test. However, the simulations may be run with a tighter range of variance where there is certain precision in the object model that is indicated by the quality metric(s). For instance, a three-dimensional printer or computer simulation environment can be informed of an accuracy of the object model, e.g., within a 1 mm range at 99.5 percent accuracy, for example.

Examples of the present disclosure may include various additional features in addition to that which is described above. For instance, in addition to changing properties of capture, in one example the controller may also add noise/ variance by capturing under motion blur, poor lighting, etc. to improve the object model precision. In one example, the control system may perform an audit of the object model learning process. For instance, if the control system determines that many additional captures were required to combat a high motion blur, those conditions (either the motion blur or the changes performed on the capture) can be used to subsequently qualify other models or uses of the object model. This is salient as technology processes are chained together and tolerances for each process are required for validation.

In one example, the adversarial examples created by the generator include random or semi-random deviations in the feature space. Alternatively, or in addition, in accordance with the present disclosure, adversarial examples may also be generated to include specific types of deviations, such as introducing "holes" or "gaps" in a three-dimensional object, introducing specific types of colors, reflectance values, capture lighting conditions, etc. In one example, the specific types of deviations may be selected based upon learned circumstances from previous object learning processes regarding the same object or similar objects. For instance, it may be determined that several additional rounds or retraining were used to refine details in a corner of an object where reflected light may have caused confusing or inconsistent measurements of physical properties from different capture angles. Thus, in one example, the adversarial models may be generated with a preference for including variations relating to this particular aspect of the object. When challenged with adversarial examples relating to this feature, the discriminator is forced to improve. The improvement is driven by the capture of additional and/or more detailed measurements via the data capture system relating to this feature of the object.

Examples of the present disclosure may also include human interactions, such as the control system instructing a person to break, damage, or otherwise manipulate the object, or to manipulate a capture device or other sensor. In one example, other sensors like sound, smell, etc. may also be incorporated into the physical property measurements and capture process. In one example, the object model may be distributed and correlated with other object models for the same object or for different objects of a same object type. For instance, an object model may model "roof" condition of a home. As this is performed across different parts of a country, the adversarial control system can collaborate to share the object model learning steps and improve capture by expressing conditions that may not exist at individual sites as variations included in adversarial examples. In one example, the object model sharing may result in the changes to initial capture instructions for a given object type. In one example, the object model sharing may result in reporting of deviations of roof conditions at a given site from a norm. For instance, the object models may be averaged, weighted averaged by a distance from a given site, or otherwise combined to provide a "normal" model, from which a deviation of the object model can be determined. These and other aspects of the present disclosure are discussed in greater detail below in connection with the examples of FIGS. 1-3.

To aid in understanding the present disclosure, FIG. 1 illustrates a block diagram depicting one example of an environment 100 suitable for performing or enabling the steps, functions, operations, and/or features described herein. For ease of reference, land 190, water 195, and sky 197 portions of environment 100 are illustrated in FIG. 1. As further illustrated in FIG. 1, the environment 100 includes a telecommunication service provider network 110. In one example, telecommunication service provider network 110 may comprise a core network, a backbone network or transport network, such as an Internet Protocol (IP)/multi-protocol label switching (MPLS) network, where label switched routes (LSRs) can be assigned for routing Transmission Control Protocol (TCP)/IP packets, User Datagram Protocol (UDP)/IP packets, and other types of protocol data units (PDUs), and so forth. It should be noted that an IP network is broadly defined as a network that uses Internet Protocol to exchange data packets. However, it will be appreciated that the present disclosure is equally applicable to other types of data units and transport protocols, such as Frame Relay, and Asynchronous Transfer Mode (ATM). In one example, the telecommunication service provider network 110 uses a network function virtualization infrastructure (NFVI), e.g., host devices or servers that are available as host devices to host virtual machines comprising virtual network functions (VNFs). In other words, at least a portion of the telecommunication service provider network 110 may incorporate software-defined network (SDN) components.

The telecommunication service provider network 110 may be in communication with one or more access networks. For instance, wireless access network 115 may comprise a cellular network (e.g., a Universal Mobile Telecommunications System (UMTS) terrestrial radio access network (UTRAN), an evolved UTRAN (eUTRAN), a base station subsystem (BSS), e.g., a Global System for Mobile communication (GSM) radio access network (GRAN), a 2G, 3G, 4G and/or 5G network, a Long Term Evolution (LTE) network, and the like). In such examples, telecommunication service provider network 110 may include evolved packet core (EPC) network components, network switching subsystem (NSS)/GSM core network and/or General Packet Radio Service (GPRS) core network components, and so forth. Thus, in one example, wireless access network 115 may include at least one cell tower 120, which may alternatively comprise a cellular base station, such as a base transceiver station (BTS), a NodeB, an evolved NodeB (eNodeB), and the like, a non-cellular wireless access point, and so forth. Cell tower 120 may include antenna arrays 121 (e.g., remote radio heads (RRHs)), a mast 122, and other components (not shown). The telecommunication service provider network 110 and the wireless access network 115 may be operated by different service providers, or by a same service provider.

In one example, telecommunication service provider network 110 is connected to other networks 118. In one example, other networks 118 may represent one or more enterprise networks, a circuit switched network (e.g., a public switched telephone network (PSTN)), a cable network, a digital subscriber line (DSL) network, a metropolitan area network (MAN), an Internet service provider (ISP) network, and the like. In one example, the other networks 118 may include different types of networks. In another example, the other networks 118 may be the same type of network. In one example, the other networks 118 may represent the Internet in general.

Illustrated in FIG. 1 are control devices 106 and 107, which may individually or collectively comprise a control system in accordance with the present disclosure. In one example, control device 106 and control device 107 may each comprise all or a portion of a computing device or system, such as computing system 300, and/or processing system 302 as described in connection with FIG. 3 below, and may be configured to perform various steps, functions, and/or operations in connection with examples of the present disclosure for improving an object model based upon measurements of physical properties of an object using adversarial examples.

In one example, a data capture system may include unmanned aerial vehicle (UAV) 160 and/or unmanned underwater vehicle (UUV) 170 in accordance with the present disclosure. UAV 160 may include at least a camera 162. In one example, UAV 160 may also include a module 164 with one or more additional controllable components, such as a microphone, an infrared, ultraviolet or visible spectrum light source, and so forth. Similarly, UUV 170 may include at least a camera 172. In one example, UUV 170 may include a module 174 with one or more additional controllable components such as an acoustic transducer, an infrared, ultraviolet or visible spectrum light source, and so forth. In addition, each UAV 160 and UUV 170 may comprise all or a portion of a computing device or system, such as computing system 300, and/or processing system 302 as described in connection with FIG. 3 below, and may be configured to perform various steps, functions, and/or operations in connection with examples of the present disclosure for improving an object model based upon measurements of physical properties of an object using adversarial examples.

Figure 3:
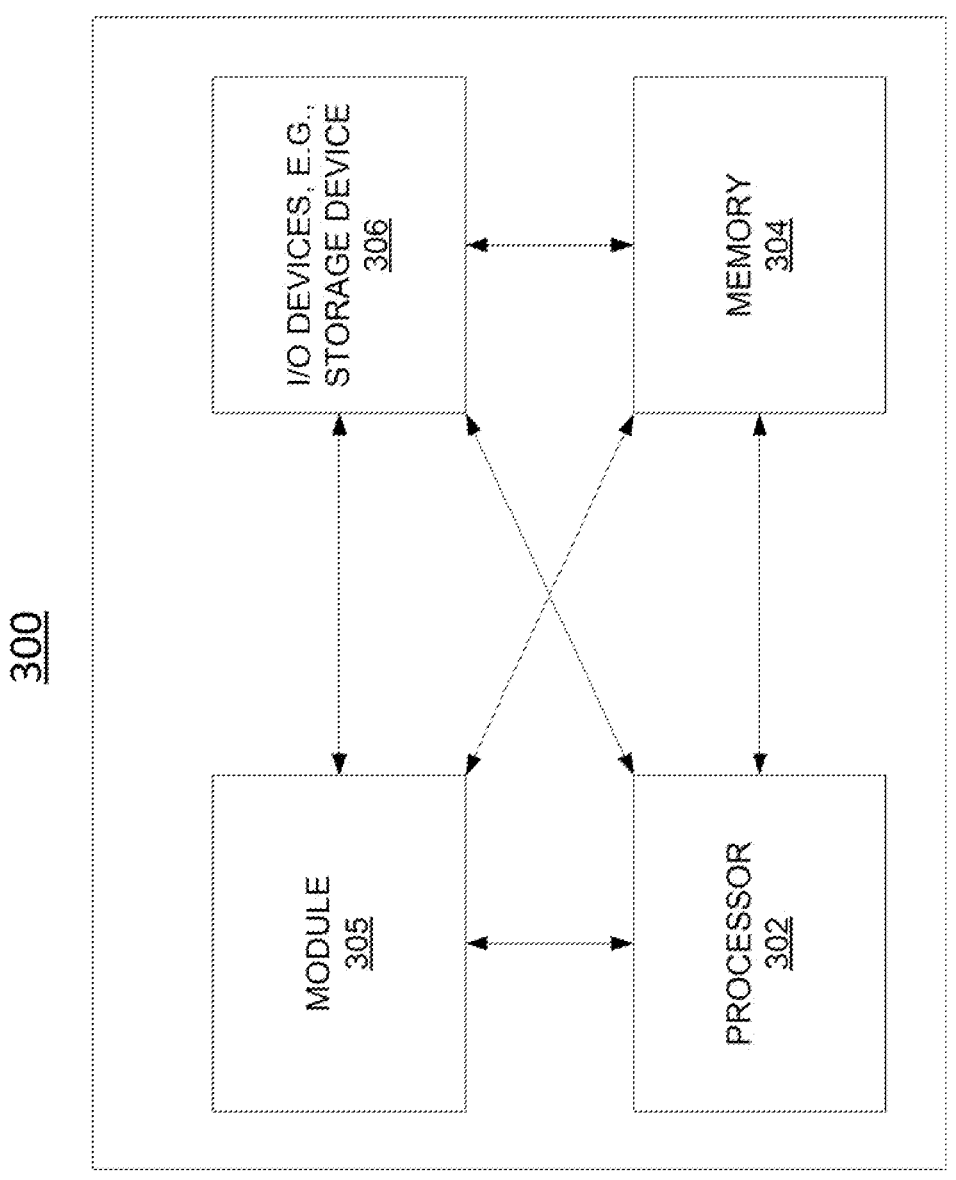
FIG. 3 illustrates an example high-level block diagram of a computing device specifically programmed to perform the steps, functions, blocks, and/or operations described herein.

It should be noted that the terms "configure" and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 3 and discussed below) or multiple computing devices collectively configured to perform various steps, functions, and/or operations in accordance with the present disclosure.

The UAV 160 and/or UUV 170 may be in communication with a control system or respective control systems (e.g., control device 106 and/or control device 107) for receiving instructions for capturing measurements of physical properties of an object and for reporting such measurements to the control system(s). Control devices 106 and 107 may store and provide initial capture instructions to capture systems regarding one or more object types. In this regard, UAV 160 may also include a transceiver 166 (e.g., an IEEE 802.11/Wi-Fi transceiver, an IEEE 802.15 based transceiver, an IEEE 802.16 based transceiver, a cellular transceiver, and so forth). In one example, control device 106 may be similarly equipped. With regard to UUV 170, the UUV 170 may communicate with the control device 107 via a wireless optical or acoustic transceiver 176 for through-water communications, or via a cable/wired communication link.

In accordance with the present disclosure, control devices 106 and 107, UAV 160, and UUV 170 may be used to generate object models for various objects in the environment 100. For instance, UAV 160 may be used to capture measurements of physical properties of cell tower 120, roof 125, vehicle 140, roadway 145, above-water portions of ship 150, and so on. Similarly, UUV 170 may be used to capture measurements of physical properties of underwater cable housing 155, the underwater portions of a hull of ship 150, and so on. Control device 106 and/or control device 107 may receive and process these measurements to learn an object model (e.g., a discriminator) and generator. Control device 106 and/or control device 107 may also send instructions to UAV 160 and/or UUV 170 respectively to capture additional measurements of physical properties of an object by repositioning, reorienting camera 162 and/or camera 172 respectively, and so on.

In one example, a network-based control system may be used as an alternative or in addition to control devices which may be deployed at or near the site of an object to be modeled via measurements from a capture system. For instance, in one example, server 112 deployed in telecommunication service provider network 110 may comprise a control system for controlling a data capture system as described herein. As such, server 112 may comprise all or a portion of a computing device or system, such as computing system 300, and/or processing system 302 as described in connection with FIG. 3 below, and may be configured to perform various steps, functions, and/or operations in connection with examples of the present disclosure for improving an object model based upon measurements of physical properties of an object using adversarial examples. For instance, in one example, the object to be modeled may comprise cell tower 120. UAV 160 may be deployed to the location of cell tower 120 to capture measurements of physical properties of cell tower 120 under the control of server 112. In addition, in such an example, the server 112 and UAV 160 may communicate via cell tower 120. For instance, transceiver 166 may comprise a cellular transceiver to communicate with sever 112 via cell tower 120.

It should be noted that the system 100 has been simplified. In other words, the system 100 may be implemented in a different form than that illustrated in FIG. 1. For example, the system 100 may be expanded to include additional networks, and additional network elements (not shown) such as wireless transceivers and/or base stations, border elements, routers, switches, policy servers, security devices, gateways, a network operations center (NOC), a content distribution network (CDN) and the like, without altering the scope of the present disclosure. In addition, system 100 may be altered to omit various elements, substitute elements for devices that perform the same or similar functions and/or combine elements that are illustrated as separate devices.

As just one example, the operations described above with respect to server 112 may alternatively or additionally be performed by a device, or a plurality of devices in other networks 118. In one example, server 112 may serve as a data collection point/aggregator for data collected from multiple capture devices and a distributor of instructions for the respective capture devices. In one example, server 112 may coordinate both UAV 160 and UUV 170, e.g., for performing a full survey of the exterior of ship 150. In such an example, control devices 106 and 107 may serve as intermediate communication points for relaying communications between server 112, UAV 160, and UUV 170. In addition, although a single server 112 is illustrated in the example of FIG. 1, in other, further, and different examples the same or similar functions may be distributed among multiple devices within the telecommunication service provider network 110, wireless access network 118, and/or other networks 118 that may collectively provide various services in connection with examples of the present disclosure for improving an object model based upon measurements of physical properties of an object using adversarial examples. For instance, server 112 may serve as a control system, UAV 160 and/or UUV 170 may serve as a capture system, initial capture instructions may be stored on a device in other networks 118 and retrieved by server 112 for the control device(s), and so on.

In addition, FIG. 1 illustrates several representative objects that may be the subject of GAN-based modeling using one or more capture devices. However, it should be understood that the components illustrated in FIG. 1 may be used to model a variety of similar objects, including any type of wireless communication tower, such as a radio broadcast tower, a power line tower, a building, a bridge (including underwater caissons), a rail line, an aircraft, and so forth. In another example, cell tower 120 may instead comprise an Institute for Electrical and Electronics Engineers (IEEE) 802.16 access point, e.g., a wireless wide area network (WWAN) or WiMAX access point, or the like. In addition, examples of the present disclosure may utilize a variety of capture devices such as maritime-based unmanned surface vehicles (USVs), land-based or amphibious unmanned ground vehicle (UGVs), and the like. Thus, these and other modifications are all contemplated within the scope of the present disclosure.

FIG. 2 illustrates a flowchart of an example method 200 for improving an object model based upon measurements of physical properties of an object via an unmanned vehicle using adversarial examples. In one example, steps, functions and/or operations of the method 200 may be performed by a control device or control system, such as control device 106, control device 107, and/or server 112 of FIG. 1, or any one or more of such devices in conjunction with one another and/or with other components, such as one or more capture devices (e.g., UAV 160 and/or UUV 170). In one example, the steps, functions, or operations of method 200 may be performed by a computing device or processing system 300, and/or processor 302 as described in connection with FIG. 3 below. Similarly, in one example, the steps, functions, or operations of method 200 may be performed by a processing system comprising one or more computing devices collectively configured to perform various steps, functions, and/or operations of the method 200. For instance, multiple instances of the computing device or processing system 300 may collectively function as a processing system, e.g., comprising a control system, and/or control system in conjunction with other components. For illustrative purposes, the method 200 is described in greater detail below in connection with an example performed by a processor, such as processor 302. The method begins in step 205 and may proceed to optional step 210 or to step 215.

At optional step 210, the processor provides initial instructions to at least one unmanned vehicle to capture measurements of physical properties of an object. In on example, the initial instructions are based upon an object type of the object. For instance, the object may comprise at least a portion of a wireless communications tower, a power line tower, a building, a bridge, a vehicle (including cars, trains, aircraft, submersibles, ships, etc.), a roadway, a pipeline, a rail line, and so on. Thus, the processor may provide a different set of initial instructions depending upon the object to be modeled. The at least one unmanned vehicle may comprise, for example: an unmanned aerial vehicle, an unmanned underwater vehicle, an unmanned ground vehicle, or an unmanned surface vehicle. In one example, the at least one unmanned vehicle includes a camera, e.g., a photo-sensor array. In one example, the at least one unmanned vehicle may further include additional components for capturing physical properties of an object, such as a microphone, an infrared, ultraviolet, or visible spectrum light source, and so forth.

At step 215, the processor captures measurements of physical properties of an object via at least one unmanned vehicle. In one example, the measurements may be made by the at least one unmanned vehicle based upon initial instructions provided at optional step 210. In one example, step 215 may include the processor sending instructions to the at least one unmanned vehicle and receiving the measurements from the at least one unmanned vehicle when captured. In one example, the measurements may include digital camera measurements, e.g., RGB (red-green-blue) or CYM (cyan-yellow-magenta) raw data (luminance values) from a photo-sensor array. In one example, the measurements may be processed to map each sensor reading to a pixel (e.g., a color filter array mapping). In one example, the measurements may be further processed using common digital image capture techniques, such as applying white balance, gamma correction, noise reduction, anti-aliasing, and so forth. However, since at least some of these techniques are primarily for recreating a faithful representation of a captured shot as perceived via human eyes, in other examples, such techniques may be omitted. In one example, step 215 may include the processor applying three-dimensional rendering techniques to multiple two-dimensional captured images. Thus, in one example, the capturing the measurements of the physical properties of an object at step 215 may include capturing the measurements for a first plurality of voxels in a three-dimensional physical space. In one example, the measurements may further include quantized measurements of sounds, detection of olfactory molecules, etc.

At step 220, the processor updates an object model for the object to include the measurements of the physical properties of the object. In one example, the object model comprises a three-dimensional model for the object. In one example, the object model is associated with a feature space. However, in one example the feature space may be a hyper-dimensional space that is representative of physical properties of an object from the three-dimensional physical space. For instance, the object model may comprise a generative adversarial network (GAN)-based discriminator. The discriminator may comprise a machine learning model that determines whether new data is or is not part of a class represented by training data; in this case the measurements of the physical properties of the object captured at step 215. In one example, the discriminator is a neural network, e.g., a deep neural network (DNN). In other examples, the discriminator may comprise a different type of machine learning model, such as a SVM-based classifier, a distance-based classifier, or the like, or a non-classifier type machine learning model, such as a decision tree, a k-nearest neighbor (KNN) predictive model, and so forth. The updating (and creation) of the object model can utilize supervised, unsupervised, or semi-supervised learning (partially labeled data). In one example, step 220 may include filling in gaps in the measured data using any number of techniques, such as linear interpolation, local kernel fitting, structure tensor-based interpolation, etc.

At optional step 225, the processor may update a GAN generator function to account for the measurements of the physical properties of the object that are captured at step 215. For instance, the generator function may comprise a machine learning model that is trained to maximize the detection error of the object function, or discriminator. In one example, the generator is a neural network, e.g., a deep neural network (DNN). In other examples, the discriminator may comprise a different type of machine learning model, such as a SVM-based classifier, a distance-based classifier, or the like. A GAN-based generator may be coupled with a source of noise function that may result in the random selection of parameters from the feature space. However, in accordance with the present disclosure, the generator may be constrained so that adversarial examples do not contradict the actual measurements. Thus, the generator function may be updated at optional step 225.

At step 230, the processor generates an example from the feature space. The example may comprise an adversarial example that is not part of the training data (the measurements of the physical properties of the object from step 215), but that is intended to mimic the training data. For instance, the example may be generated in accordance with a GAN-based generator, or generator subroutine of a GAN. The generator seeks to provide adversarial examples that are indistinguishable by the discriminator from the training data (the measurements of the physical properties of the object from step 215). In one example, the adversarial example may be constrained to a predetermined deviation from a measured value of a physical property of the object. For instance, the deviation could be indicated with a value range or a percentage range. In the case of a SVM-based generator, the generator may comprise a hyperplane, and the generating of an adversarial example may comprise sampling points within a certain distance from the hyperplane. In one example, the adversarial example is constrained to a predetermined deviation from a previous object model for the object. In one example, the permissible deviations ranges with respect to one or more aspects may be defined by a technician, equipment operator, equipment supplier, a person or entity associated with the object to be modeled, another system subscribing to receive the object model, and so forth. In one example, step 230 may include including a known deviation pattern to a previous object model for the object in order to generate the adversarial example. For instance, for aspects of the object model that may have been in-filled, color estimated, depth estimated, etc., the adversarial examples may be created to include specific types of deviation patterns associated with the regions or aspects of the object model.

In one example, the specific types of deviation patterns may be provided by a technician, equipment operator, equipment supplier, a person or entity associated with the object to be modeled, another system subscribing to receive the object model, etc. In another example, the specific types of deviation patterns may alternatively or additionally be determined from past object model training regarding the same object, or different objects of a same object type. For example, as described above, it may be determined that several additional rounds or retraining were used to refine details in a corner of an object where reflected light may have caused confusing or inconsistent measurements of physical properties from different capture angles. Thus, in one example, the adversarial models may be generated with a preference for including variations relating to this particular aspect of the object.

At step 235, the processor applies the object model to the example to generate a prediction. In particular, the applying the object model to the example to generate a prediction is in accordance with a GAN discriminator subroutine that may be updated at step 220. For instance, the discriminator may output a zero or a one depending upon whether the object model determines that the adversarial example is a fake or is taken from the actual measurements of the physical properties of the object. In one example, step 235 may include applying the object model to a number of examples, both adversarial examples and examples drawn from the actual measurements of the physical properties of the object.

At step 240, the processor determines whether a target accuracy is achieved. For instance, the method 200 may relate to learning an object model via iterations of a GAN-based learning process. In one example, additional measurements are captured over a plurality of cycles of generating adversarial examples and updating the object model until a number or a percentage of the examples are (correctly) identified by the processor as adversarial examples. The same condition may alternatively be stated as: when a classification of the object model is minimized, is below a threshold, or has been reduced and remained substantially unchanged over a plurality of cycles, or when the generator and the discriminator (the object model) have reached a stable balance and neither is improved through subsequent cycles. When the target accuracy is not achieved, the method 200 may proceed to step 245.

At step 245, the processor captures additional measurements of the physical properties of the object via the at least one unmanned vehicle when the prediction fails to identify that the example is an adversarial example. For example, the capturing the additional measurements of the physical properties of the object may comprise at least one of: repositioning the at least one unmanned vehicle, reorienting a camera of the at least one unmanned vehicle, or changing a lighting condition of the object via a light of the at least one unmanned vehicle. In one example, step 245 may include the processor sending instructions to the at least one unmanned vehicle and receiving the additional measurements from the at least one unmanned vehicle when captured.

Step 245 may also include changing the capture conditions, e.g., by waiting for a weather or lighting change, a temperature change, a humidity change, by manipulating the object via automated arms of the at least one unmanned vehicle, and so forth. As described above, step 215 may include capturing the measurements for a first plurality of voxels in a three-dimensional physical space. Accordingly, in one example the capturing the additional measurements of the physical properties of the object at step 245 may comprise capturing the additional measurements for a second plurality of voxels in the three-dimensional physical space. For instance, the at least one unmanned vehicle may be repositioned to capture measurements for a different portion of the object than for the measurements at step 215. Following step 245, the method 200 returns to step 220 to update the object model to include the additional measurements of the physical properties of the object. The subsequent iteration of step 220 may include the same or similar operations as the first iteration of step 220 described above. The method 200 may further continue to subsequently perform operations of steps 220-235.

When it is determined at step 240 that the target accuracy has been achieved, the method 200 may proceed to optional step 250, optional step 260, or to step 295. At optional step 250, the processor may compare the object model to a previous object model for the object to determine at least one difference between the object model and the previous object model. For instance, the object may comprise a cell tower and a previous object model for the cell tower may have been generated six months earlier. In one example, the previous object model may have been generated in accordance with a previous iteration of the method 200. In one example, the object model and the previous object model may comprise differentiable functions, each comprising a plurality of parameters, such that the differences may be quantified through mathematical operations.

At optional step 255, the processor may generate a report of differences, the report comprising the at least one difference. In one example, the report may include any parameters for which the object model and the previous version of the object model differ. In one example, the report may include any parameters for which the object model and the previous version of the object model differ more than a threshold value or percentage. In one example, the feature space in which the object model and previous version of the object model exist may not directly represent the physical three dimensional space in which the object exists. As such, in one example, the differences may be translated from the feature space into representations of a physical space. In one example, the report may be a visual report that is output via a display. For example, one or more regions of deviation from the previous object model may be indicated visually with highlighting, circling, etc.

At optional step 260, the processor may determine a quality metric for the object model. In one example, the quality metric may comprise an indication or guarantee that a feature of the object model is accurate within a defined range. In one example, the quality metric may be a corollary of a predefined deviation that is defined at step 230. For instance, if the generator is constrained to select distance values which deviate within a plus and minus 5 mm range and the discriminator reaches 99.5 percent accuracy in detecting adversarial examples, the quality metric may include an indication that the object model is 99.5 percent accurate to within 1 cm. The quality metric can be defined in advance by a subscribing system requesting the object model or can be based upon the processor achieving as accurate as possible of an object model via the method 200. For instance, due to capture conditions, the processor may determine that the object model can at best be made 90 percent accurate to within a 1 cm resolution. Thus, this may be reported as the quality metric that is determined at optional step 260.

At optional step 265, the processor may provide the object model and the quality metric to a subscribing system. For instance, a wind load simulation system may request an object model for a cell tower. The wind load simulation system may then run simulations of various wind conditions in a virtual environment using the object model. In another example, a three dimensional printing system may request an object model for a ship hull to fabricate a scale replica for wave testing. In still another example, the subscribing system may be a database that stores object models for various object of a same object type, such as a centralized network-based repository for object models of cell towers of the network.

Following step 240, or any of the optional steps 250-265, the method 200 may proceed to step 295. At step 295, the method 200 ends.

It should be noted that the method 200 may be expanded to include additional steps. For instance, in one example the method 200 may further include setting initial parameters for the object model, or discriminator. For example, the method 200 may be performed to learn an object model for an object that has been previously modeled. Thus, in one example, the discriminator may be initially set to comprise the parameters of the previous discriminator. The GAN-based learning of the method 200 may then test and refine the object model, which should be updated to reflect any changes to the object through adversarial learning. In another example, the processor may omit optional step 210. For example, there may be no prior knowledge of what object, if any, is at a location. In such case, the at least one unmanned vehicle may be deployed to a location to perform a blind capture with no preconceived notion of what exists at the location. However, in another example, step 210 may be omitted where the capture system may already store or be configured with initial capture instructions for a relevant object or object type. In one example, the generator function may be updated at optional step 225 with a greater frequency than the updating of the object model at step 220 through a plurality of iterations of the loop from step 220 to step 245. In another example, post-capture data processing, such as linear interpolation, local kernel fitting, structure tensor-based interpolation, and the like may be applied at step 215 instead of at step 220. Similarly, three-dimensional rendering may be applied at step 220 instead of at step 215. Thus, these and other modifications are all contemplated within the scope of the present disclosure.

In addition, it should be noted that although not specifically specified, one or more steps, functions or operations of the method 200 may include a storing, displaying and/or outputting step as required for a particular application. In other words, any data, records, fields, and/or intermediate results discussed in the respective methods can be stored, displayed and/or outputted to another device as required for a particular application. Furthermore, steps or blocks in FIG. 2 that recite a determining operation or involve a decision do not necessarily require that both branches of the determining operation be practiced. In other words, one of the branches of the determining operation can be deemed as an optional step. In addition, one or more steps, blocks, functions, or operations of the above described method 200 may comprise optional steps, or can be combined, separated, and/or performed in a different order from that described above, without departing from the example embodiments of the present disclosure.

FIG. 3 depicts a high-level block diagram of a computing device or processing system specifically programmed to perform the functions described herein. As depicted in FIG. 3, the processing system 300 comprises one or more hardware processor elements 302 (e.g., a central processing unit (CPU), a microprocessor, or a multi-core processor), a memory 304 (e.g., random access memory (RAM) and/or read only memory (ROM)), a module 305 for improving an object model based upon measurements of physical properties of an object using adversarial examples, and various input/output devices 306 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). In accordance with the present disclosure input/output devices 306 may also include antenna elements, antenna arrays, remote radio heads (RRHs), baseband units (BBUs), transceivers, power units, cameras, and so forth. Although only one processor element is shown, it should be noted that the computing device may employ a plurality of processor elements. Furthermore, although only one computing device is shown in the figure, if the method 200 as discussed above is implemented in a distributed or parallel manner for a particular illustrative example, i.e., the steps of the above method 200, or the entire method 200 is implemented across multiple or parallel computing devices, e.g., a processing system, then the computing device of this figure is intended to represent each of those multiple computing devices.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computing device or any other hardware equivalents, e.g., computer readable instructions pertaining to the method discussed above can be used to configure a hardware processor to perform the steps, functions and/or operations of the above disclosed method 200. In one embodiment, instructions and data for the present module or process 305 for improving an object model based upon measurements of physical properties of an object using adversarial examples (e.g., a software program comprising computer-executable instructions) can be loaded into memory 304 and executed by hardware processor element 302 to implement the steps, functions or operations as discussed above in connection with the illustrative method 200. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 305 for improving an object model based upon measurements of physical properties of an object using adversarial examples (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not a limitation. Thus, the breadth and scope of a preferred embodiment should not be limited by any of the above-described exemplary embodiments, but should be defined only in accordance with the following claims and their equivalents.

What is claimed is:

1. A device comprising:

a processing system including at least one processor; and a computer-readable medium storing instructions which, when executed by the processing system, cause the processing system to perform operations, the operations comprising:

obtaining measurements of a plurality of physical properties of an object in accordance with one or more capture conditions via at least one sensor;

training an object model for the object with the measurements of the plurality of physical properties of the object as training data to distinguish between the object and generated examples of the object, wherein the object model comprises a discriminator subroutine of a generative adversarial network implemented by the processing system, and wherein the object model is associated with a feature space;

generating an example from the feature space, wherein the example is representative of the object, wherein the generating of the example from the feature space uses a generator subroutine of the generative adversarial network implemented by the processing system;

applying the object model comprising the discriminator subroutine to the example to output a prediction of whether the example is a generated example;

obtaining, via the at least one sensor, additional measurements of the plurality of physical properties of the object in response to the prediction failing to identify that the example is the generated example, wherein the obtaining of the additional measurements includes changing at least one of the one or more capture conditions via the at least one sensor;

retraining the object model comprising the discriminator subroutine with the additional measurements of the plurality of physical properties of the object;

comparing the object model to a previous object model for the object to determine at least one difference between the object model and the previous object model; and generating a report of differences, the report comprising the at least one difference.

2. The device of claim 1, wherein the object model comprises a three-dimensional model for the object.

3. The device of claim 1, wherein the additional measures are obtained via the at least one sensor deployed on at least one unmanned vehicle comprising at least one of:

an unmanned aerial vehicle;

an unmanned underwater vehicle;

an unmanned ground vehicle; or an unmanned surface vehicle.

4. The device of claim 3, wherein the at least one sensor comprises a camera.

5. The device of claim 4, wherein the at least one sensor further comprises at least one of:

a microphone;

a light source; or a control arm.

6. The device of claim 1, wherein the obtaining the additional measurements of the plurality of physical properties of the object comprises at least one of:

repositioning at least one unmanned vehicle comprising the at least one sensor to capture the additional measurements;

reorienting a camera of at least one unmanned vehicle comprising the at least one sensor to capture the additional measurements; or changing a lighting condition of the object via a light of at least one unmanned vehicle comprising the at least one sensor to capture the additional measurements.

7. The device of claim 1, wherein the obtaining the measurements of the plurality of physical properties of the object comprises obtaining the measurements for a first plurality of voxels in a three-dimensional physical space, and wherein the obtaining the additional measurements of the plurality of physical properties of the object comprises obtaining the additional measurements for a second plurality of voxels in the three-dimensional physical space.

8. The device of claim 1, wherein the generating the example from the feature space is constrained to a predetermined deviation from a measured value of a physical property of the plurality of physical properties of the object.

9. The device of claim 1, wherein the generating the example from the feature space is constrained to a predetermined deviation from a previous object model for the object.

10. The device of claim 9, wherein the generating the example from the feature space comprises:

including a known deviation pattern to the previous object model for the object.

11. The device of claim 1, wherein the additional measurements are obtained over a plurality of cycles of examples generated from the feature space and the object model is retrained until a number or a percentage of the examples are identified as adversarial examples.

12. The device of claim 1, wherein the operations further comprise:

determining a quality metric for the object model.

13. The device of claim 12, wherein the quality metric comprises:

a guarantee that a feature of the object model is accurate within a defined range.

14. The device of claim 12, wherein the operations further comprise:

providing the object model and the quality metric to a subscribing system.

15. The device of claim 1, wherein the operations further comprise:

providing initial instructions to at least one unmanned vehicle comprising the at least one sensor to obtain the measurements of the plurality of physical properties of the object, wherein the initial instructions are based upon information of the object.

16. The device of claim 1, wherein the object comprises at least a portion of:

a wireless communications tower;

a power line tower, a building;

a bridge;

a ship;

a vehicle;

a roadway;

a pipeline; or a rail line.

17. A method comprising:

obtaining, by a processing system including at least one processor, measurements of a plurality of physical properties of an object in accordance with one or more capture conditions via at least one sensor;

training, by the processing system, an object model for the object with the measurements of the plurality of physical properties of the object as training data to distinguish between the object and generated examples of the object, wherein the object model comprises a discriminator subroutine of a generative adversarial network implemented by the processing system, and wherein the object model is associated with a feature space;

generating, by the processing system, an example from the feature space, wherein the example is representative of the object, wherein the generating of the example from the feature space uses a generator subroutine of the generative adversarial network implemented by the processing system;

applying, by the processing system, the object model comprising the discriminator subroutine to the example to output a prediction of whether the example is a generated example;

obtaining, by the processing system via the at least one sensor, additional measurements of the plurality of physical properties of the object in response to the prediction failing to identify that the example is the generated example, wherein the obtaining of the additional measurements includes changing at least one of the one or more capture conditions via the at least one sensor;

retraining, by the processing system, the object model comprising the discriminator subroutine with the additional measurements of the plurality of physical properties of the object;

comparing, by the processing system, the object model to a previous object model for the object to determine at least one difference between the object model and the previous object model; and generating, by the processing system, a report of differences, the report comprising the at least one difference.

18. A non-transitory computer-readable medium storing instructions which, when executed by a processing system including at least one processor, cause the processing system to perform operations, the operations comprising:

obtaining measurements of a plurality of physical properties of an object in accordance with one or more capture conditions via at least one sensor;

training an object model for the object the measurements of the plurality of physical properties of the object as training data to distinguish between the object and generated examples of the object, wherein the object model comprises a discriminator subroutine of a generative adversarial network implemented by the processing system, and wherein the object model is associated with a feature space;

generating an example from the feature space, wherein the example is representative of the object, wherein the generating of the example from the feature space uses a generator subroutine of the generative adversarial network implemented by the processing system;

applying the object model comprising the discriminator subroutine to the example to output a prediction of whether the example is a generated example;

obtaining, via the at least one sensor, additional measurements of the plurality of physical properties of the object in response to the prediction failing to identify that the example is the generated example, wherein the obtaining of the additional measurements includes changing at least one of the one or more capture conditions via the at least one sensor;

retraining the object model comprising the discriminator subroutine with the additional measurements of the plurality of physical properties of the object;

comparing the object model to a previous object model for the object to determine at least one difference between the object model and the previous object model; and generating a report of differences, the report comprising the at least one difference.

19. The non-transitory computer-readable medium of claim 18, wherein the object model comprises a three-dimensional model for the object.

20. The non-transitory computer-readable medium of claim 18, wherein the additional measures are obtained via the at least one sensor deployed on at least one unmanned vehicle comprising at least one of:

an unmanned aerial vehicle;

an unmanned underwater vehicle;

an unmanned ground vehicle; or an unmanned surface vehicle.

* * * * *